United States Patent
Arrigoni et al.

(12)

(10) Patent No.: US 7,101,943 B2
(45) Date of Patent: Sep. 5, 2006

(54) PEROXIDE-CURABLE FLUOROELASTOMERS

(75) Inventors: Stefano Arrigoni, Novara (IT); Margherita Albano, Milan (IT)

(73) Assignee: Solvay Solexis S.p.A., Milan (IT)

(*) Notice: Subject to any disclaimer, the term of this patent is extended or adjusted under 35 U.S.C. 154(b) by 0 days.

(21) Appl. No.: 10/270,606

(22) Filed: Oct. 16, 2002

(65) Prior Publication Data

US 2003/0088040 A1    May 8, 2003

(30) Foreign Application Priority Data

Oct. 18, 2001    (IT) ................................ MI01A2164

(51) Int. Cl.
*C08F 114/18* (2006.01)

(52) U.S. Cl. .................... 526/253; 526/247; 526/252; 526/326.2

(58) Field of Classification Search ................ 526/253, 526/252, 247; 525/326.2
See application file for complete search history.

(56) References Cited

U.S. PATENT DOCUMENTS

| | | | |
|---|---|---|---|
| 3,132,123 A | 5/1964 | Harris, Jr. et al. | |
| 3,450,684 A | 6/1969 | Darby | |
| 3,752,787 A | 8/1973 | de Brunner | |
| 3,810,874 A | 5/1974 | Mitsch et al. | |
| 3,817,960 A | 6/1974 | Resnick | |
| 3,876,654 A * | 4/1975 | Pattison | 524/113 |
| 4,035,565 A | 7/1977 | Apotheker et al. | |
| 4,233,427 A | 11/1980 | Bargain et al. | |
| 4,243,770 A | 1/1981 | Tatemoto et al. | |
| 4,259,463 A | 3/1981 | Moggi et al. | |
| 4,487,903 A | 12/1984 | Tatemoto et al. | |
| 4,564,662 A | 1/1986 | Albin | |
| 4,694,045 A * | 9/1987 | Moore | 525/276 |
| 4,745,165 A | 5/1988 | Arcella et al. | |
| 4,766,190 A | 8/1988 | Morita et al. | |
| 4,789,717 A | 12/1988 | Giannetti et al. | |
| 4,864,006 A | 9/1989 | Giannetti et al. | |
| 4,943,622 A | 7/1990 | Naraki et al. | |
| 4,990,283 A | 2/1991 | Visca et al. | |
| 5,173,553 A | 12/1992 | Albano et al. | |
| 5,268,405 A | 12/1993 | Ojakaar et al. | |
| 5,401,818 A | 3/1995 | Oka et al. | |
| 5,430,381 A | 7/1995 | Dower | |
| 5,585,449 A * | 12/1996 | Arcella et al. | 526/247 |
| 5,648,429 A | 7/1997 | Chiodini et al. | |
| 5,648,430 A | 7/1997 | Chiodini et al. | |
| 6,294,627 B1 | 9/2001 | Worm et al. | |
| 6,642,331 B1 * | 11/2003 | Apostolo et al. | 526/247 |

FOREIGN PATENT DOCUMENTS

| | | |
|---|---|---|
| EP | 0 120 462 | 10/1984 |
| EP | 0 130 052 | 1/1985 |
| EP | 0 136 596 | 4/1985 |
| EP | 0 182 299 | 5/1986 |
| EP | 0 199 138 | 10/1986 |
| EP | 0 335 705 | 10/1989 |
| EP | 0 410 351 | 1/1991 |
| EP | 0 708 797 | 5/1996 |
| EP | 1 148 072 A2 | 4/2001 |
| EP | 1 148 072 | 10/2001 |
| EP | 1 262 497 A2 | 5/2002 |
| EP | 1 262 517 A1 | 5/2002 |

OTHER PUBLICATIONS

Maskornick M. et al. "ECD-006 Perfluoroelastomer a High Performance Engineering Material" Soc. Plast Eng. Tech. Pao. (1974), 20, 675-7.

J. Macromol. Sci.-Phys., B1(4), 815-830 (Dec. 1967) Development of Vulcanizable Elastomers Suitable for use in Contact with Liquid Oxygen.

I.L. Knunyants et al.—Izv. Akad. Nauk. SSR, Ser. Khim. 1964 (2), 384-6.

European Search Report, No. EP 02 02 2754.

* cited by examiner

*Primary Examiner*—David W. Wu
*Assistant Examiner*—Henry S Hu
(74) *Attorney, Agent, or Firm*—Arent Fox, PLLC

(57) ABSTRACT

Fluoroelastomers, curable by peroxidic route, obtainable by polymerizing the following monomers:
a) $C_2$–$C_8$ hydrogenated fluoroolefins;
b) fluorovinylethers of general formula:

(I)    $CFX=CXOCF_2OR$ c) bis-olefins having general formula:

$$R^I_1R^I_2C=CR^I_3-Z-CR^I_4=CR^I_5R^I_6 \quad (IA)$$

and optionally:
d) one or more fluorinated olefinic comonomers selected from perfluoroalkylvinylethers (PAVE) $CF_2=CFOR^2_f$, perfluorooxyalkylvinylethers $CF_2=CFOX^a$,
e) $C_2$–$C_8$ perfluoroolefins;
f) one or more $C_2$–$C_8$ non fluorinated olefinic comonomers said fluoroelastomers comprising iodine and/or bromine atoms in the chain and/or in end position.

31 Claims, No Drawings

PEROXIDE-CURABLE FLUOROELASTOMERS

The present invention relates to fluoroelastomers having an improved combination of mechanical properties, compression set and at low temperature properties and to the process for preparation thereof.

It is well known that perfluoroalkylvinylethers are generally used as monomers for the copolymerization of olefins such vinylidene fluoride (VDF) to obtain fluoroelastomers suitable to give manufactured articles such O-ring and shaft seal, above all used in the car and chemical industry. The introduction of perfluorovinylether high amounts in crosslinkable fluoroelastomers implies elasticity properties at low temperature of fluorinated rubbers.

The need was felt to have available fluoroelastomers having improved properties at low temperatures in combination with improved mechanical and compression set properties.

To solve said technical problem fluorovinylethers with various structural properties have been proposed in the prior art. However from the prior art the obtained polymers do not show the combination of the above properties.

U.S. Pat. No. 3,132,123 describes the preparation of perfluoroalkylvinylethers, of the respective homopolymers and copolymers with TFE. The homopolymers are obtained under extreme experimental conditions, using polymerization pressures from 4,000 to 18,000 atm. The homopolymer of the perfluoromethylvinylether (MVE) is an elastomer: however its Tg is not sufficiently low. The general formula of the described vinylethers is the following:

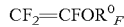

wherein $R^o{}_F$ is a perfluoroalakyl radical preferably from 1 to 5 carbon atoms.

U.S. Pat. No. 3,450,684 relates to vinylethers of formula:

wherein $X^o$=F, Cl, $CF_3$, H; n' can range from 1 to 20.

Also the homopolymers obtained by UV polymerization are described. The exemplified copolymers are not characterized with their mechanical and elastomeric properties at low temperatures.

U.S. Pat. No. 3,817,960 relates to the preparation and polymerization of perfluorovinylethers of formula:

wherein n" can range from 1 to 5. Characterization data on the above properties are not described.

U.S. Pat. No. 4,487,903 relates to the fluoroelastomeric copolymer preparation wherein perfluorovinylethers of formula:

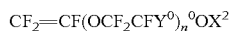

are used, wherein $n^o$ ranges from 1 to 4; $Y^o$=F, Cl, $CF_3$, H; $X^2$ can be $C_1$–$C_3$ perfluoroalkyl, $C_1$–$C_3$ ω-hydroperfluoroalkyl, $C_1$–$C_3$ ω-chloroperfluoroalkyl. The polymer has a fluorovinylether unit content ranging from 15 to 50% by moles. Said vinylethers give copolymers having at low temperatures properties superior to those of the above perfluorovinylethers of PVE (perfluoropropylvinylether) and MVE type. Also in this case characterization data relating to the above properties of the cured elastomer are not indicated.

EP 130,052 describes the polymerization of the perfluorovinylpolyethers (PVPE) which leads to the obtainment of amorphous perfluoropolymers having a $T_g$ ranging from −15° to −100° C. The described polymers have $T_g$ values which reach −76° C.; the further $T_g$ decrease is obtained by using perfluoropolyethers as plasticizers. In the patent copolymers and terpolymers of TFE and MVE with vinylethers (PVPE) of formula:

are described, wherein n''' ranges from 3 to 30 and $R^o{}_f$ is a perfluoroalkyl. Due to purification difficulties, the used vinylethers are mixtures of vinylethers with different values of n'''. According to this patent the most marked effect on the $T_g$ decrease is shown when n''' is equal to or higher than 3, preferably higher than 4.

U.S. Pat. No. 4,766,190 relates to the polymerization of perfluorovinylpolyethers (PVPE), similar to those described in U.S. Pat. No. 4,487,903, with TFE and low percentages of perfluoro propene, to increase the mechanical properties of the obtained polymers. No improvement of the mechanical and elastomeric properties at low temperatures is described.

U.S. Pat. No. 5,268,405 discloses the preparation of perfluorinated rubbers having a low Tg, by using perfluoropolyethers having a high viscosity as plasticizers of perfluorinated rubbers (TFE/MVE copolymers). The obtained manufactured articles have the drawback that during the use exudations of the perfluoropolyethers (PFPE) take place, in particular when PFPE has low molecular weight (low viscosity): in the patent it is therefore disclosed the PFPE use having high viscosity; those having low viscosity must be previously removed.

U.S. Pat. No. 5,401,818 relates to the perfluorovinylether preparation of formula:

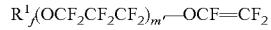

(wherein $R^1{}_f$ is a $C_1$–$C_3$ perfluoroalkyl radical; m' is an integer ranging from 1 to 4) and of the respective copolymers having improved properties at low temperature. The preparation of said perfluorovinylethers requires also a perfluorination with elementary $F_2$ which from the industrial point of view requires supplementary process unities.

Furthermore it is well known that by increasing the perfluorooxyalkylene units which are part of the side perfluorooxyalkylene substituent of perfluorooxyalkylvinylethers, the Tg of the obtained amporphous copolymers decreases. However it is not possible to obtain polymers with the optimal combination of the above properties.

The amorphous copolymers of TFE with perfluoromethylvinylether have $T_g$ of about 0° C. or a little lower (Maskornik, M. et al. "ECD-006 Fluoroelastomer—A high performance engineering material". Soc. Plast Eng. Tech. Pao. (1974), 20, 675–7). The extrapoplated value of the MVE homopolymer $T_g$ is of about −5° C. (J. Macromol. Sci.-Phys., B1(4), 815–830, December 1967).

In patent application EP 1,148,072 fluorovinylethers allowing to lower the $T_g$ of the respective copolymers are described but the mechanical and elastomeric properties of the obtained manufactured articles are not described.

In U.S. Pat. No. 6,294,627 copolymers based on VDF with fluorovinylethers of formula:

are described, wherein mm=1–4; nn=0–6; pp=1–2; $R_{fXL}$=$C_1$–$C_4$ perfluorinated alkyl group. In the Examples of this patent fluorovinylethers having a number of oxygen atoms higher than or equal to 4 and mm=2, are used. Low Tg values but unsatisfactory mechanical properties are obtained, such for example the stress at break lower than 7 MPa and hardness values lower than 62 Shore A.

The fluoroelastomers described in the prior art do not show the optimal combination of the above properties, in particular it would be desirable to have available fluoroelastomers which when cured show the following combination of properties:

improved mechanical and elastomeric properties,
high resistance to low temperatures as for example shown by TR 10 (ASTM D 1329 method),
much lower Tg with respect to vinylethers having the same oxygen number and carbon atoms,
higher productivity of fluoropolymer in Kg of polymer/(hour×litre of water).

The Applicant has surprisingly and unexpectedly found that it is possible to solve the above technical problem as described hereinafter.

An object of the present invention are curable fluoroelastomers obtainable by polymerizing the following monomers:

a) $C_2$–$C_8$ hydrogenated fluoroolefins, such as vinyl fluoride (VF), vinylidene fluoride (VDF), trifluoroethylene, perfluoroalkylethylenes $CH_2=CH-R^2_f$, wherein $R^2_f$ is a $C_1$–$C_6$ perfluoroalkyl;

b) fluorovinylethers of general formula:

$$CFX=CXOCF_2OR \quad (I)$$

wherein
R has the following meanings:
  $C_2$–$C_6$ linear or branched (per)fluoroalkyl,
  $C_5$–$C_6$ cyclic (per)fluoroalkyl,
  $C_2$–$C_6$ linear or branched (per)fluoro oxyalkyl, containing from one to three oxygen atoms,
X=F, H;

c) bis-olefins having general formula:

$$R^I_1R^I_2C=CR^I_3-Z-CR^I_4=CR^I_5R^I_6 \quad (IA)$$

wherein
$R^I_1$, $R^I_2$, $R^I_3$, $R^I_4$, $R^I_5$, $R^I_6$ equal to or different from each other, are H or $C_1$–$C_5$ alkyl;
Z is a $C_1$–$C_{18}$ linear or branched alkylene or $C_4$–$C_{18}$ cycloalkylene radical, optionally containing oxygen atoms, preferably at least partially fluorinated, or a (per)fluoropolyoxyalkylene radical;

d) optionally, one or more fluorinated olefinic comonomers selected from the following:
  (per)fluoroalkylvinylethers (PAVE) $CF_2=CFOR^2_f$, wherein $R^2_f$ is a $C_1$–$C_6$ (per)fluoroalkyl, for example trifluoromethyl, heptafluoropropyl;
  (per)fluoro-oxyalkylvinylethers $CF_2=CFOX^a$, wherein $X^a$ is a $C_1$–$C_{12}$ alkyl, or a $C_1$–$C_{12}$ oxyalkyl, or a $C_1$–$C_{12}$ (per)fluoro-oxyalkyl having one or more ether groups, for example perfluoro-2-propoxy-propyl;

e) optionally, $C_2$–$C_8$ perfluoroolefins, such as tetrafluoroethylene (TFE), hexafluoropropene (HFP); and/or chlorotrifluoroethylene (CTFE);

f) optionally, one or more $C_2$–$C_8$ non fluorinated olefinic comonomers, for example ethylene, propylene, isobutene;

said fluoroelastomers comprising halogen atoms selected from iodine and/or bromine in the chain and/or in end position, said halogen atoms deriving from "cure site" comonomers and/or from chain transfer agents used in polymerization.

The preferred fluoroolefin component a) is VDF.
The preferred fluorovinylethers component b) are those of general formula:

$$CFX=CXOCF_2OCF_2CF_2Y \quad (II)$$

wherein Y=F, $OCF_3$; X as above,
the perfluorovinylethers of formula:

$$CF_2=CFOCF_2OCF_2CF_3 \quad (MOVE\ 1)$$

$$CF_2=CFOCF_2OCF_2CF_2OCF_3 \quad (MOVE\ 2)$$

are the most preferred.

Preferably in the bis-olefin component c) of formula (IA) $R^I_1$, $R^I_2$, $R^I_3$, $R^I_4$, $R^I_5$, $R^I_6$ are hydrogen and Z is a $C_4$–$C_{12}$ perfluoroalkylene radical or a (per)fluoropolyoxyalkylene radical of formula:

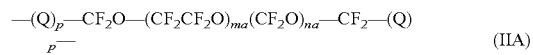

$$-(Q)_p-CF_2O-(CF_2CF_2O)_{ma}(CF_2O)_{na}-CF_2-(Q)_p- \quad (IIA)$$

wherein:
Q is a $C_1$–$C_{10}$ alkylene or oxyalkylene radical, preferably selected from $-CH_2OCH_2-$; $-CH_2O(CH_2CH_2O)_sCH_2-$, s being = an integer from 1 to 3;
p is an integer and is zero or 1;
ma and na are numbers such that the ma/na ratio is from 0.2 to 5, the molecular weight of the (per)fluoropolyoxyalkylene radical of formula (IIA) being from 500 to 10,000, preferably from 1,000 to 4,000. More preferably the bis-olefin has formula:

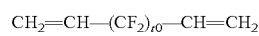

$$CH_2=CH-(CF_2)_{t0}-CH=CH_2$$

wherein t0 is an integer from 6 to 10.

The iodine and/or bromine atoms in the chain and/or in end position of the polymer can be introduced by brominated and/or iodinated "cure site" comonomers, such for example the following:
  $C_2$–$C_{10}$ bromo and/or iodo olefins, containing at least one atom, preferably from one to three bromine and/or iodine atoms,
  $C_1$–$C_{10}$ linear or branched (per)fluoroalkylvinylethers and/or (per)fluorooxyalkylvinylethers containing at least one iodine and/or bromine atom.

The iodine and/or bromine atom in the polymer end position can be introduced also using iodinated and/or brominated chain transfer agents, such as for example the following:
  compounds of formula $R^b_f(I)_x(Br)_y$, wherein $R^b_f$ is a (per)fluoroalkyl or a (per)fluorochloroalkyl having from 1 to 8 carbon atoms, while x and y are integers comprised between 0 and 2, with $1 \leq x+y \leq 2$;
  iodides and/or bromides of alkaline or alkaline-earth metals.

Preferably the fluoroelastomer contains iodine atoms in the chain and/or in end position.

The preferred optional component d) is perfluoromethylvinylether (MVE) having formula $CF_2=CF-O-CF_3$.

As said, the fluoropolymers of the invention show the combination of the above properties.

In particular the Tg lowering obtained by using the vinylethers component b) is due to the presence of the ($-OCF_2O-$) unit directly linked to the unsaturation. Besides it has been found that said unit increases the reactivity of the vinylether component b).

Compared with the VDF based polymers, optionally TFE, of the prior art, the polymers of the invention show a much lower Tg, never obtained with the vinylethers having the same number of oxygen and carbon atoms of the prior art incorporated in VDF based polymer.

The advantages of the polymers of the invention can be summarized as follows:
- better mechanical and elastomeric properties;
- very good reactivity of the fluorovinylethers component b), in Kg of polymer/(hour×litre of water);
- low Tg;
- low TR 10.

The amount of fluorovinylethers component b) usable to obtain the perfluoroelastomers of the invention must be such to lead to the crystalline site disappearance so to obtain an amorphous copolymer.

Generally the amount of units deriving from the fluorovinylether component b) which allows to obtain amorphous polymers is preferably higher than 15% by moles, more preferably higher than 17% by moles. There are no limits to the maximum amount of b): molar amounts up to 80–90% can generally be used. If in the polymer, besides units deriving from the fluorovinylether component b), units deriving from the optional monomers component d) and/or from HFP and/or CTFE (component e)) are present, the total amount by moles of b)+d)+HFP+CTFE must be higher than 15%, preferably higher than 17% by moles. The total molar amount of b)+d) can reach percentages of 80–90%.

The amount of units in the chain deriving from the bisolefin component c) is generally from 0.01 to 2.0% by moles, preferably from 0.05 to 0.8% by moles.

The amount of units deriving from brominated and/or iodinated "cure-site" comonomers in the final compound is from 0 to 5% by moles.

The iodine and/or bromine amount from transfer agent present in the chain end groups is from 0% to 2% by weight, preferably from 0.05% to 0.8% by weight.

The total amount of iodine and/or bromine present in the perfluorinated polymer is in the range 0.05%–4% by weight.

The fluoroelastomers of the invention are preferably copolymers based on VDF, wherein VDF is copolymerized with the fluorovinylethers component b) and with the bisolefin component c); wherein also one or more comonomers selected from component d), component e) and f) can optionally be present.

The preferred monomeric compositions, in % by moles, are the following:

| | |
|---|---|
| VDF | 5–85, pref. 20–85 |
| component b) | 1–45, pref. 5–40 |
| component c) | 0.01–2 |
| iodine amount (in % by weight) | 0.05–0.6 |
| component d) | 0–45, pref. 5–30 |
| component e) | 0–60 |
| component f) | 0–40, pref. 5–20 | the sum of the molar percentages of component b)+component d)+component e) when component e) is different from TFE, being such to give an amorphous polymer; said sum being higher than 15%, preferably higher than 17%, and the sum of the molar percentages of the monomers being equal to 100%. In said preferred compositions b) is MOVE 1 and/or MOVE 2, c) is the preferred above indicated bisolefin, d) is MVE, e) is HFP, optionally in the presence of TFE; or TFE, f) is ethylene.

The bis-olefins component c) of formula (IA) wherein Z is an alkylene or cycloalkylene radical can be prepared as for example described by I. L. Knunyants et al. in Izv. Akad. Nauk. SSR, Ser. Khim. 1964(2), 384–6, while the bis-olefins containing (per)fluoropolyoxyalkylene sequences are described in U.S. Pat. No. 3,810,874.

The brominated and/or iodinated "cure-site" comonomers are for example described in U.S. Pat. No. 4,035,565 and U.S. Pat. No. 4,694,045, U.S. Pat. No. 4,745,165, U.S. Pat. No. 4,564,662 and EP 199,138.

For the iodinated and/or brominated chain transfer agents see for example U.S. Pat. No. 4,243,770 and U.S. Pat. No. 4,943,622.

For the chain transfer agents formed by iodides and/or bromides of alkaline or alkaline-earth metals see U.S. Pat. No. 5,173,553.

The preparation of fluoroelastomers of the present invention is carried out by copolymerization of the monomers in aqueous emulsion in the presence of an emulsion, dispersion or microemulsion of perfluoropolyoxyalkylenes, according to U.S. Pat. No. 4,789,717 and U.S. Pat. No. 4,864,006. Preferably the synthesis is carried out in the presence of a perfluoropolyoxyalkylene microemulsion.

According to well known methods of the prior art, radical initiators, for example, alkaline or ammonium persulphates, perphosphates, perborates or percarbonates, optionally in combination with ferrous, cupreous or silver salts, or of other easily oxidizable metals, are used. In the reaction medium also surfactants of various type are optionally present, among which the fluorinated surfactants of formula:

are particularly preferred, wherein $R^3_f$ is a $C_5$–$C_{16}$ (per) fluoroalkyl chain or a (per)fluoropolyoxyalkyl chain, $X^-$ is —COO$^-$ or —SO$_3^-$, $M^+$ is selected from: $H^+$, $NH_4^+$, alkaline metal ion. Among the most commonly used we remember: ammonium perfluorooctanoate, (per)fluoropolyoxyalkylenes ended with one or more carboxyl groups, etc. See U.S. Pat. No. 4,990,283 and U.S. Pat. No. 4,864,006.

The polymerization reaction is generally carried out at temperatures in the range 25° C.–150° C., at a pressure comprised between the atmospheric one up to 10 MPa.

Alternatively or in combination with the chain transfer agents containing iodine and/or bromine other chain transfer agents known in the prior art, as ethyl acetate, diethylmalonate, etc., can be used.

When the polymerization is over, the fluoroelastomer is isolated from the emulsion by conventional methods, as the coagulation by addition of electrolytes or by cooling.

The fluorelastomers object of the present invention are preferably cured by peroxidic route, according to known techniques, by addition of a suitable peroxide capable to generate radicals by heating.

Among the most commonly used peroxides the following are mentioned: dialkylperoxides, such for example, di-tert-butyl-peroxide and 2,5-dimethyl-2,5-di(tert-butylperoxy) hexane; dicumyl peroxide, dibenzoyl peroxide; di-tert-buty perbenzoate; di-[1,3-dimethyl-3-(tert-butyperoxy)butyl]carbonate. Other peroxidic systems are described for example in European patent applications EP 136,596 and EP 410,351.

To the curing blend other compounds are then added, such as:
(A) curing coagents, in an amount generally in the range 0.5–10%, preferably 1–7%, by weight with respect to the polymer; among them those commonly used are: bis-olefins of formula (IA); triallyl-cyanurate, triallyl-isocyanurate (TAIC), tris(diallylamine)-s-triazine; tri-allylphosphite; N,N-diallyl-acrylamide; N,N,N',N'-tetra-allylmalonamide; tri-vinyl-isocyanurate; and 4,6-tri-vinyl-methyltrisiloxane, etc.: TAIC and the bis-olefin of formula:

$$CH_2=CH-(CF_2)_6-CH=CH_2$$

are particularly preferred;

(B) optionally a metal compound, in an amount in the range 0–15%, preferably 2–10%, by weight with respect to the polymer, selected from oxides and hydroxides of divalent metals, such for example Mg, Zn, Ca or Pb, optionally combined with a weak acid salt, such for example stearates, benzoates, carbonates, oxalates or phosphites of Ba, Na, K, Pb, Ca;

(C) optionally acid acceptors, in an amount from 0 to 10% by weight with respect to the polymer, of the non metal oxide type, such 1,8 bis dimethyl amino naphthalene, octadecylamine etc. as described in EP 708,797;

(D) optionally conventional additives, such thickeners, pigments, antioxidants, stabilizers and the like, the amount of each of said additives being between 0 and 10% by weight with respect to the polymer;

(E) optionally fillers in amounts from 0 to 80% by weight with respect to the polymer, preferably from 15 to 50% by weight, such for example carbon black, silica, barium sulphate, titanium dioxide, etc. Fillers of semicrystalline fluoropolymers, such PTFE, MFA and PFA, can also be present.

The copolymers of the invention when cured by peroxidic route show a very good combination of properties, in particular they satisfy the following test: a copolymer having the following composition in percent by moles:

| | |
|---|---|
| vinylidene fluoride (VDF) | 80.92% |
| fluorovinylethers component b) MOVE 1 | 19.00% |
| bis-olefin component c) of formula $CH_2=CH-(CF_2)_6-CH=CH_2$ | 0.08% | having as attack sites for the peroxidic crosslinking:
  iodine present on the chain end groups by the iodinated transfer agent 1,4-diiodoperfluorobutane ($C_4F_8I_2$), in a an amount equal to 0.2% by weight,
  bromine, present in the chain by the comonomer 4-bromo-heptafluoroethylvinylether $CF_2=CF-O-CF_2CF_2Br$, in an amount equal to 0.78% by weight, in a compound containing for 100 phr of fluoroelastomer:

| | |
|---|---|
| Luperco ® 101 XL* | 2 |
| DRIMIX ® TAIC** | 4 |
| ZnO | 5 |
| Black MT ®N990 | 30 |

*containing 45% by weight of 2,5-dimethyl-2,5-di(ter-butylperoxy)hexane
**containing 75% by weight of TAIC cured in press for 10 minutes at 160° C., subjected to post-cure in an air forced circulation stove at 230° C. for 4 hours, after a warming step from room temperature to 230° C. lasting one hour, shows the following combination of properties:

| | |
|---|---|
| stress at break (ASTM D 412-83) | >13 MPa |
| elongation at break (ASTM D 412-83) | >120% |
| hardness (shore A) | >65 |
| compression set (ASTM D 395) on O-ring at 200° C. for 70 h | <40% |
| TR 10 (ASTM D 1329) | ≦−40° C. |

The fluoroelastomers of the present invention can also be ionically cured. To the curing blend suitable curing and accelerating agents well known in the prior art are added, besides the components (B), (C), (D), (E). For example, as curing agents aromatic or aliphatic polyhydroxylated compounds, or derivatives thereof, can be used, as described for example in EP 335,705 and U.S. Pat. No. 4,233,427. Among them we remember in particular: di-, tri- and tetra-hydroxy-benzenes, naphthalenes and anthracenes; bisphenols wherein the two aromatic rings are linked each other by an aliphatic, cycloaliphatic or aromatic bivalent radical, or by one oxygen or sulphur atom, or also a carbonyl group. The aromatic rings can be substituted with one or more chlorine, fluorine, bromine atoms or with carbonyl, alkyl, acyl.

As accelerants it can for example be used: ammonium, phosphonium, arsonium, or antimony quaternary salts (see for example EP 335,705 and U.S. Pat. No. 3,876,654); amino-phosphonium salts (see for example U.S. Pat. No. 4,259,463); phosphoranes (see for example U.S. Pat. No. 3,752,787); iminic compounds described in EP 182,299 and EP 120,462; etc. Adducts between an accelerant and a curing agent can also be used, see U.S. Pat. No. 5,648,429, U.S. Pat. No. 5,430,381, U.S. Pat. No. 5,648,430 herein incorporated by reference.

It is also possible to use systems of mixed, both ionic and peroxidic, curing, as described in EP 136,596.

The synthesis process of the (per)fluorovinylethers component b) comprises the following steps:

a') initial reaction of the hypofluorite with a fluorinated olefin of formula $R_1R_2C=CR_3R_4$ to give the hypofluorite $$CF_2(OF)_2 + R_1R_2C=CR_3R_4 \rightarrow F-CR_1R_2-CR_3R_4-OCF_2OF \quad (VI)$$

b') reaction of the hypofluorite with a second fluorinated olefin of formula $R_5R_6C=CR_7R_8$ to give the intermediate $$F-CR_1R_2-CR_3R_4-OCF_2O-CR_5R_6-CR_7R_8-F,$$
$$F-CR_1R_2-CR_3R_4-OCF_2OF+$$
$$R_5R_6C^2=C^1R_7R_9 \rightarrow F-CR_1R_2-CR_3R_4-$$
$$OCF_2O-C^2R_5R_6-C^1R_7R_8-F \quad (VII)$$

c') dehalogenation or dehydrohalogenation and obtainment of the perfluorovinylethers.

(I)

$$F-CR_1R_2-CR_3R_4-OCF_2O-C^2R_5R_6-C^1R_7R_8-F \xrightarrow[\text{/dehydrohalogen.}]{\text{dehalogen./}} CFX=CXOCF_2OR$$

In said synthesis scheme:
  with reference to the formula of compound (VII):
    $R_1$, $R_4$, equal or different, are H, F; $R_2$, $R_3$, equal or different are H, Cl at the following conditions: (1) if the final reaction is a dehalogenation $R_2$, $R_3$=Cl, (2)

if the final reaction is a dehydrohaloagenation one of the two substituents $R_2$, $R_3$ is H and the other is Cl;

$R_5$, $R_6$, $R_7$, $R_8$ are:

F, or one of them is a $C_1$–$C_4$ linear or branched perfluoroalkyl group, or a $C_1$–$C_4$ linear or branched perfluorooxyalkyl group containing from one to three oxygen atoms, or $R_5$ and $R_7$, or $R_6$ and $R_8$, are linked each other to form with $C^2$ and $C^1$ a $C_5$–$C_6$ perfluoroalkyl cycle;

when one of the radicals $R_5$–$R_8$ is a $C_2$–$C_4$ linear or branched fluoroalkyl, or a $C_2$–$C_4$ linear or branched fluorooxyalkyl containing from one to three oxygen atoms, one or two of the other $R_5$–$R_8$ are F and one or two of the remainders, equal to or different from each other, are selected from H, Cl; when the substituents selected from H and Cl are two, they are both linked to the same carbon atom; when $R_5$ and $R_7$, or $R_6$ and $R_8$, are linked each other to form with $C^2$ and $C^1$ a $C_5$–$C_6$ fluoroalkyl cycle, one of the two free substituents $R_6$, $R_8$ or $R_5$, $R_7$ is F and the other is selected from H, Cl.

the fluoroalkene used in the reaction a') is replaceable with that of the subsequent reaction b'); in this case the meanings defined for the substituents of the $R_1$–$R_4$ group, and respectively of the $R_5$–$R_8$ group, are interchangeable among each other, with the proviso that the position of each radical of each of the two groups $R_1$–$R_4$ and $R_5$–$R_8$ with respect to —$OCF_2O$— on the chain of the intermediate compound (VII), is the same which is occupied when the synthesis takes place according to the above scheme, and the two olefins react each in the planned steps.

In the first reaction a') of the above scheme a hypofluorite gas flow $CF_2(OF)_2$, suitably diluted with an inert fluid, comes into contact, in a suitable reactor equipped with outlet, on the bottom of the same (first reactor), with a flow formed by the olefin $R_1R_2C$=$CR_3R_4$, optionally diluted in an inert fluid, so to allow the chemical reaction a') with formation of the intermediate hypofluorite (VI). To favour the reaction stoichiometry the reactants must be introduced into the reactor in an about unitary molar ratio, or with an excess of $CF_2(OF)_2$. The residence time of the mixture in the reactor can range from few hundredths of second up to about 120 seconds depending on the olefin reactivity, the reaction temperature and the presence of optional reaction solvents.

The reaction temperature can range from −40 to −150° C., preferably from −80° to −130° C.

Compound (VI) is usually not separated from the reaction crude compound and is continuously transferred in the subsequent reaction described in step b').

The compound mixture coming out from the first reactor can be heated to room temperature before being fed to the second reactor.

In the second reaction b') the second olefin $R_5R_6C$=$CR_7R_8$ at the pure state or in solution, reacts with the compound obtained in the first reaction with formation of compound (VII).

The olefin can be continuously fed so as to maintain constant its concentration in the reactor. The temperature of the reaction b') can range from −20° to −130° C., preferably from −50 to −100° C. The olefin concentration is higher than or equal to 0.01M, preferably the concentration is higher than 3M, more preferably the pure compound can also be used.

The solvents used in steps a') and b') are perfluorinated or chlorohydrofluorinated solvents or hydrofluorocarbons.

Examples of said solvents are: $CF_2Cl_2$, $CFCl_3$, $CF_3CF_2H$, $CF_3CFH_2$, $CF_3CF_2CF_3$, $CF_3CCl_2H$, $CF_3CF_2Cl$.

In the reaction c') compound (VII), depending on the olefins used in steps a') and b'), upon distillation from the reaction crude compound, is subjected to dechlorination or to dehydrochlorination to obtain the vinylethers of formula (I).

This last step can be carried out by using reactions widely described in the prior art. The suitable selection of the substituents from $R_1$ to $R_8$ in the two olefins used in the synthesis allows to obtain the vinylethers of the present invention.

The following Examples are reported with the purpose to illustrate the invention and they do not limit the scope thereof.

EXAMPLE 1

Copolymer VDF/MOVE 1 81/19% by Moles

In a 2 litre autoclave, equipped with stirrer working at 800 rpm, are introduced, after air evacuation, 1.3 litres of demineralized water and 20 ml of a microemulsion obtained by mixing:

4.3 ml of a perfluoropolyoxyalkylene having acid end group of formula:

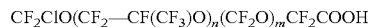

wherein n/m=10, having average molecular weight of 600;

4.3 ml of an aqueous solution of $NH_3$ at 30% by volume;

8.8 ml of demineralized water;

2.6 ml of Galden®DO2 of formula:

wherein n/m=20, having average molecular weight of 450.

The autoclave inside was then heated to the temperature of 80° C., maintaining said temperature for the whole reaction. Then 35 g of $CF_2$=$CF$—$O$—$CF_2$—$O$—$CF_2CF_3$ (MOVE 1) and 1.2 g of 1,4-diiodoperfluorobutane ($C_4F_8I_2$) were added.

The autoclave is then pressurized at 8 bar (0.8 MPa) with pure vinylidene fluoride (VDF).

When this step is ended, in the autoclave are introduced:

0.065 g of ammoniumpersulphate (APS) as initiator;

0.6 g of bis-olefin of formula $CH_2$=$CH$—$(CF_2)_6$—$CH$=$CH_2$; the compound addition was carried out for a total of 20 portions, each of 0.03 g, starting from the beginning of the polymerization and for every 5% increase in the monomer conversion;

8.6 g of 4-bromo-heptafluoroethylvinylether $CF_2$=$CF$—$O$—$CF_2CF_2Br$; the compound addition was carried out for a total of 20 portions, each of 0.43 g, starting from the beginning of the polymerization and for every 5% increase in the monomer conversion;

112 g of $CF_2$=$CF$—$O$—$CF_2$—$O$—$CF_2CF_3$ (MOVE 1); the compound addition is carried out for a total of 19 portions each of 5.9 g, starting when the monomer conversion equal to 5% takes place and continuing at every 5% increase in the monomer conversion.

The pressure of 8 bar (0.8 MPa) is maintained constant for the whole polymerization by feeding pure vinylidene fluoride (VDF)

After 70 minutes of reaction, corresponding to 100% of the monomer conversion, the autoclave is cooled and the latex discharged.

The so obtained latex is coagulated with a solution of aluminum sulphate (6 g of $Al_2(SO_4)_3$ for each litre of latex) and dried at 90° C. in an air circulating oven for 16 hours. 220 g of polymer are obtained.

By $^{19}$F-NMR analysis of the polymer hot dissolved in $C_6F_6$, the molar percentage of MOVE 1 in the polymer, equal to 19%, is determined.

The $T_g$, determined by DSC is –41° C.

The intrinsic viscosity of the polymer in tetrahydrofuran (THF) is 35 ml/g. The percentages by weight of iodine and bromine in the polymer, measured by XRF, are, respectively, 0.20% and 0.78% by weight.

The Mooney viscosity (ML(1+10'@121° C.)) determined according to the ATSM D 1646 method is 7 MU.

EXAMPLE 2 (COMPARATIVE)

Copolymer TFE/MOVE 1 76/24

In a 40 ml AISI-316 reactor for polymerization, equipped with magnetic stirring, pressure transducer and inlet for the feeding and discharge of the reactants, 250 µl of perfluoropropionylperoxide at 3% by weight of $CFCl_2CF_2Cl$, 9.8 mmoles of MOVE 1 and 18 mmoles of tetrafluoroethylene are introduced.

The reactor is cooled to the temperature of –196° C., evacuated, then brought again to room temperature and cooled again, the whole twice.

At the end of the degassing operations, the reactor is thermostated at the temperature of 30° C. and the reaction mixture maintained under magnetic stirring. The internal pressure decreases from 6.4 atm to 4.7 atm in about 8 hours (reaction time).

After distillation of the unreacted monomers and polymer stripping under vacuum for 3 hours at 150° C., 1,100 mg of polymer are recovered, which appears as a transparent and colourless rubber.

By $^{19}$F-NMR analysis of the polymer hot dissolved in $C_6F_6$ it is determined that the molar percentage of MOVE 1 in the polymer is 24%.

The $T_g$, determined by DSC, is –21.4° C. The intrinsic viscosity of the polymer measured at 30° C. in Fluorinert® FC-75, is of 35.5 ml/g.

EXAMPLE 3 (COMPARATIVE)

Copolymer TFE/β-PDE ($CF_3OCF_2CF_2OCF=CF_2$) 77/23

In a reactor for polymerizations equal to that described in Example 2, 250 µl of perfluoropropionylperoxide at 3% by weight in $CFCl_2-CF_2Cl$, 10 mmoles of β-PDE and 18 mmoles of tetrafluoroethylene are in sequence introduced.

The procedure described in the previous Example 2 is followed till the thermostating step at the temperature of 30° C. under magnetic stirring.

By $^{19}$F-NMR analysis carried out on the polymer, it is determined that the molar percentage of β-PDE in the polymer is 23%. The $T_g$ determined by DSC is –4.8° C.

Said Tg value is higher than that obtained in the TFE/MOVE 1 copolymer of Example 2 which contains a substantially identical molar percentage of vinylether.

TABLE 1

| EXAMPLES | | 1 |
|---|---|---|
| Formulation: | | |
| Luperco 101 XL | phr | 2 |
| Drimix TAIC | " | 4 |
| ZnO | " | 5 |
| Black MT N990 | | 30 |
| Iodine | % by weight | 0.2 |
| Bromine | % by weight | 0.78 |
| Mooney polymer $ML_{121° (1+10)}$ | | 7 |
| MDR arc 0.5°, 160° C., 12' (ASTM D 6204-97): | | |
| ML | Lbf. in. | 0.03 |
| MH | " | 14.4 |
| ts2 | " | 1.1 |
| t'50 | " | 2.0 |
| t'90 | " | 11.7 |
| Mechanical properties after post-cure at 230° C. for 1 + 4 h (ASTM D 412-83) | | |
| M100 | Mpa | 9.3 |
| Stress at break | " | 14.5 |
| Elong. at break | % | 130 |
| Hardness Shore A | | 69 |
| Compression set 200° C. for 70 h O-ring (ASTM D 395) | % | 35 |
| TR 10 (ASTM D 1329) | ° C. | –40 |

The invention claimed is:

1. Curable fluoroelastomers having good properties at low temperature, in particular a lower Tg and high resistance to low temperatures (TR10), said fluoroelastomers comprising units derived from the following monomers:
   a) vinylidene fluoride VDF
   b) fluorovinylethers of general formula:

$$CFX=CXOCF_2OR \quad (I)$$

wherein
   R is:
   $C_2-C_6$ linear or branched (per)fluoroalkyl,
   $C_5-C_6$ cyclic (per)fluoroalkyl, or
   $C_2-C_6$ linear or branched (per)fluoro oxyalkyl, containing from one to three oxygen atoms, and
   X=F, H;
   c) bis-olefins having general formula:

$$R^I_1R^I_2C=CR^I_3-Z-CR^I_4=CR^I_5R^I_6 \quad (IA)$$

wherein
   $R^I_1$, $R^I_2$, $R^I_3$, $R^I_4$, $R^I_5$, $R^I_6$ equal to or different from each other, are H or $C_1-C_5$ alkyl;
   Z is a $C_1-C_{18}$ linear or branched alkylene or $C_4-C_{18}$ cycloalkylene radical, optionally containing oxygen atoms or a (per)fluoropolyoxyalkylene radical;
   d) optionally, one or more fluorinated olefinic comonomers selected from the following:
   (per)fluoroalkylvinylethers (PAVE) $CF_2=CFOR^2_f$, wherein $R^2_f$ is a $C_1-C_6$ perfluoroalkyl;
   (per)fluoro-oxyalkylvinylethers $CF_2=CFOX^a$, wherein $X^a$ is a $C_1-C_{12}$ alkyl, or a $C_1-C_{12}$ oxyalkyl, or a $C_1-C_{12}$ (per)fluoro-oxyalkyl having one or more ether groups;
   e) optionally, $C_2-C_8$ perfluoroolefins;
   f) optionally, one or more $C_2-C_8$ non fluorinated olefinic comonomers;
   said fluoroelastomers comprising iodine and/or bromine atoms in the chain and/or in end position, said halogen atoms deriving from "cure site" comonomers and/or from chain transfer agents used in polymerization.

2. Fluoroelastomers according to claim 1, wherein the fluorovinylethers component b) have general formula:

$$CFX=CXOCF_2OCF_2CF_2Y \quad (II)$$

wherein Y=F, $OCF_3$; X as above.

3. Fluoroelastomers according to claim 2, wherein the perfluorovinylethers have the following formulas:

$$CF_2=CFOCF_2OCF_2CF_3 \quad (MOVE\ 1)$$

$$CF_2=CFOCF_2OCF_2CF_2OCF_3 \quad (MOVE\ 2).$$

4. Fluoroelastomers according to claim 3, wherein the perfluorovinylether is $CF_2=CFOCF_2OCF_2CF_3$ (MOVE 1).

5. The curable fluoroelastomers of claim 1, wherein the $C_4$–$C_{18}$ cycloalkylene radical is partially fluorinated.

6. Fluoroelastomers according to claim 1, wherein in formula (IA) of the bis-olefin component c) $R^I_1, R^I_2, R^I_3, R^I_4, R^I_5, R^I_6$, are hydrogen and Z is a $C_4$–$C_{12}$ perfluoro-alkylene radical or a (per)fluoropolyoxyalkylene radical of formula:

$$-(Q)_p-CF_2O-(CF_2CF_2O)_{ma}(CF_2O)_{na}-CF_2-(Q)_p- \quad (IIA)$$

wherein:
Q is a $C_1$–$C_{10}$ alkylene or oxyalkylene radical;
p is zero or 1;
ma and na are numbers such that the ma/na ratio is from 0.2 to 5;
the molecular weight of the (per)fluoropolyoxyalkylene radical of formula (IIA) being from 500 to 10,000.

7. The fluoroelastomers of claim 6, wherein Q is —$CH_2OCH_2$— or —$CH_2O(CH_2CH_2O)_sCH_2$—, wherein s is an integer from 1 to 3".

8. The fluoroelastomers of claim 6, wherein the molecular weight of the (per)fluoropolyoxyalkylene radical of formula (IIA) is from 1,000 to 4,000.

9. Fluoroelastomers according to claim 6, wherein the bis-olefin has formula:

$$CH_2=CH-(CF_2)_{t0}-CH=CH_2$$

wherein t0 is an integer from 6 to 10.

10. The curable fluoroelastomers of claim 1, wherein
the $C_1$–$C_6$ (per)fluoroalkyl of the optional one or more fluorinated olefinic comonomers is selected from the group consisting of trifluoromethyl and heptafluoropropyl;
the $C_1$–$C_{12}$ (per)fluoro-oxyalkyl of the optional one or more fluorinated olefinic comonomers is perfluoro-2-propoxy-propyl;
the optional $C_2$–$C_8$ perfluoroolefins are selected from the group consisting of tetrafluoroethylene (TFE), hexafluoropropene (HFP), and chlorotrifluoroethylene (CTFE); and
the optional one or more $C_2$–$C_8$ non-flourinated olefinic comonomers are selected from the group consisting of ethylene propylene and isobutene.

11. Fluoroelastomers according to claim 1, wherein the brominated and/or iodinated "cure site" comonomers are selected from the following:
$C_2$–$C_{10}$ bromo and/or iodo olefins, containing at least one bromine and/or iodine atom,
$C_1$–$C_{10}$ linear or branched (per)fluoroalkylvinylethers and/or (per)fluorooxyalkylvinylethers containing at least one iodine and/or bromine atom.

12. The fluoroelastomers of claim 11, wherein the $C_2$–$C_{10}$ bromo and/or iodo olefins contain from one to three bromine and/or iodine atoms.

13. Fluoroelastomers according to claim 11, containing iodine atoms in the chain and/or in end position.

14. Fluoroelastomers according to claim 1, wherein iodinated and/or brominated chain transfer agents are selected from the following: p1 compounds of formula $R^b_f(I)_x(Br)_y$, wherein $R^b_f$ is a (per)fluoroalkyl or a (per)fluorochloroalkyl having from 1 to 8 carbon atoms, while x and y are integers between 0 and 2, with 1<x+y<2;
iodides and/or bromides of alkaline or alkaline-earth metals.

15. Fluoroelastomers according to claim 1, wherein the optional component d) is perfluoromethylvinylether (MVE) $CF_2=CF-O-CF_3$.

16. Fluoroelastomers according to claim 1, wherein the amount of units deriving from the fluorovinylether component b) is higher than 15% by moles.

17. The fluoroelastomers according to claim 16, wherein the amount of units deriving from the fluorovinylether component b) is higher than 17% by moles.

18. Fluoroelastomers according to claim 1, wherein the total amount of units deriving from the fluorovinylether component b), from the optional monomers component d), from HFP and CTFE (component e), is higher than 15%.

19. The fluoroelastomers according to claim 18, wherein the total amount of units deriving from the fluorovinylether component b), from the optional monomers component d), from HFP and CTFE (component e), is higher than 17% by moles.

20. Fluoroelastomers according to claim 1, wherein the amount of units in the chain deriving from the bis-olefin component c) is from 0.01% to 2.0% by moles.

21. The fluoroelastomers according to claim 20, wherein the amount of units in the chain deriving from the bis-olefin component c) is from 0.05% to 0.8% by moles.

22. Fluoroelastomers according to claim 1, wherein the amount of units deriving from brominated and/or iodinated "cure-site" comonomers is from 0% to 5% by moles, the iodine and/or bromine amount from transfer agent present in the chain end groups is from 0% to 2% by weight.

23. Fluoroelastomers according to claim 22, wherein the total amount of iodine and/or bromine present in the polymer is in the range 0.05% to 4% by weight.

24. The fluoroelastomers according to claim 22, wherein the iodine and/or bromine amount from transfer agent present in the chain end groups is from 0.05% to 0.8% by weight.

25. Fluoroelastomers according to claim 1, having the following monomeric composition, in % by moles:

| | |
|---|---|
| VDF | 5–85 |
| component b) | 1–45 |
| component c) | 0.01–2 |
| iodine amount (as % by weight) | 0.05–0.6 |
| component d) | 0–45 |
| component e) | 0–60 |
| component f) | 0–40 | the sum of the molar percentages of component b)+component d)+component e) when component e) is different from TFE, being higher than 15%, and the sum of the molar percentages of the monomers being equal to 100%.

26. Fluoroelastomers according to claim 25, having the following monomeric composition, in % by moles:

| | |
|---|---|
| VDF | 20 to 85 |
| component b) | 5 to 40 |
| component c) | 0.01 to 2 |
| iodine amount (as % by weight) | 0.05 to 0.6 |
| component d) | 5 to 30 |
| component e) | 0 to 60 |
| component f) | 5 to 20 | the sum of the molar percentages of component b) +component d) +component e) when component e) is different from TFE, being higher than 17%, and the sum of the molar percentages of the monomers being equal to 100%.

27. Blends curable by peroxidic route containing the fluoroelastomers according to claim 1; and
   (A) curing coagents, in an amount in the range 0.5% to 10% by weight with respect to the polymer;
   (B) optionally a metal compound, in an amount in the range 0% to 15%, selected from oxides and hydroxides of divalent metals, optionally combined with a weak acid salt of Ba, Na, K, Pb, Ca;
   (C) optionally acid acceptors, in an amount from 0% to 10% by weight with respect to the polymer, of the non metal oxide type;
   (D) optionally additives, the amount of each of said additives being between 0% and 10% by weight with respect to the polymer;
   (E) optionally fillers in amounts from 0% to 80% by weight with respect to the polymer.

28. Blends curable by peroxidic route containing the fluoroelastomers according to claim 27; and
   (A) curing coagents, in an amount in the range 0.5% to 10% by weight with respect to the polymer;
   (B) optionally a metal compound selected from oxides and hydroxides of Mg, Zn, Ca or Pb, optionally combined with stearates, benzoates, carbonates, oxalates or phosphites of Ba, Na, K, Pb, or Ca;
   (C) optionally acid acceptors selected from 1,8-bis(dimethylamino)naphthalene or octadecylamine;
   (D) optionally additives selected from thickeners, pigments, antioxidants, or stabilizers;
   (E) optionally a filler selected from carbon black, silica, barium sulphate, titanium dioxide, or semicrystalline fluoropolymers in amounts from 15% to 50% by weight with respect to the polymer.

29. Fluoroelastomers according to claim 1 cured by ionic route.

30. Fluoroelastomers cured according to claim 1.

31. Manufactured articles obtained from fluoroelastomers according to claim 27.

* * * * *